United States Patent Office 3,465,785
Patented Sept. 9, 1969

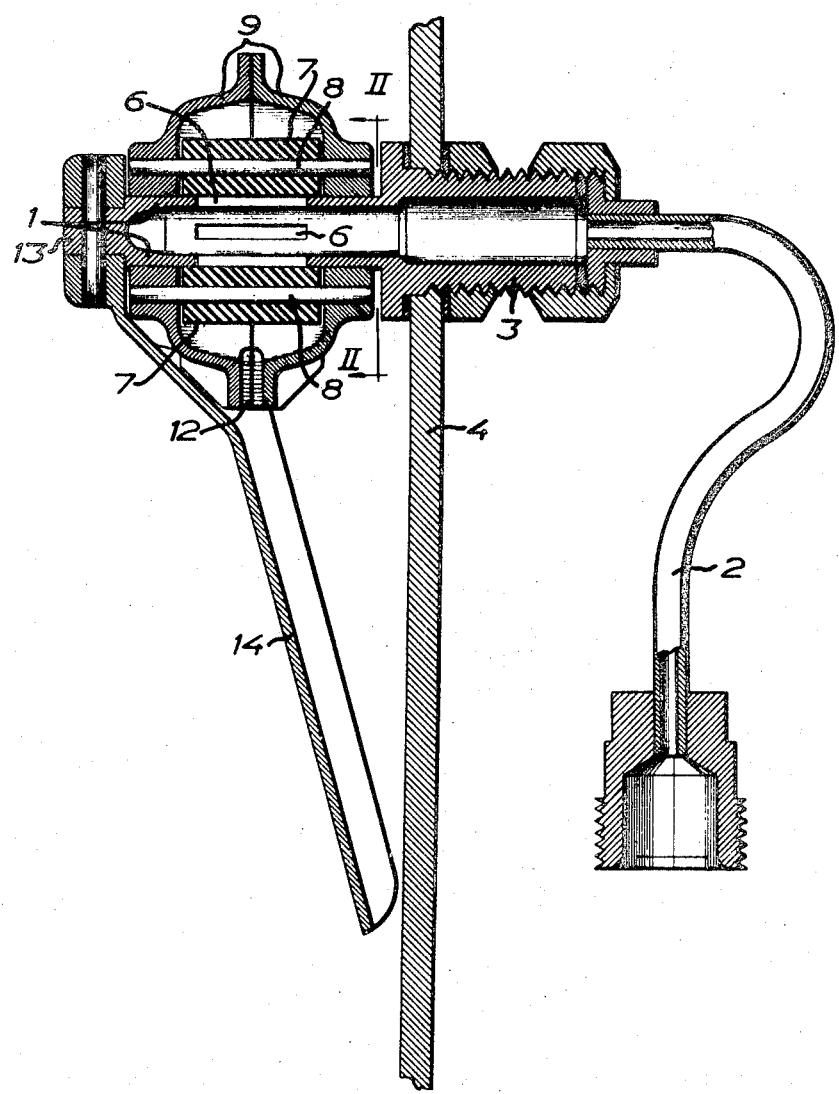

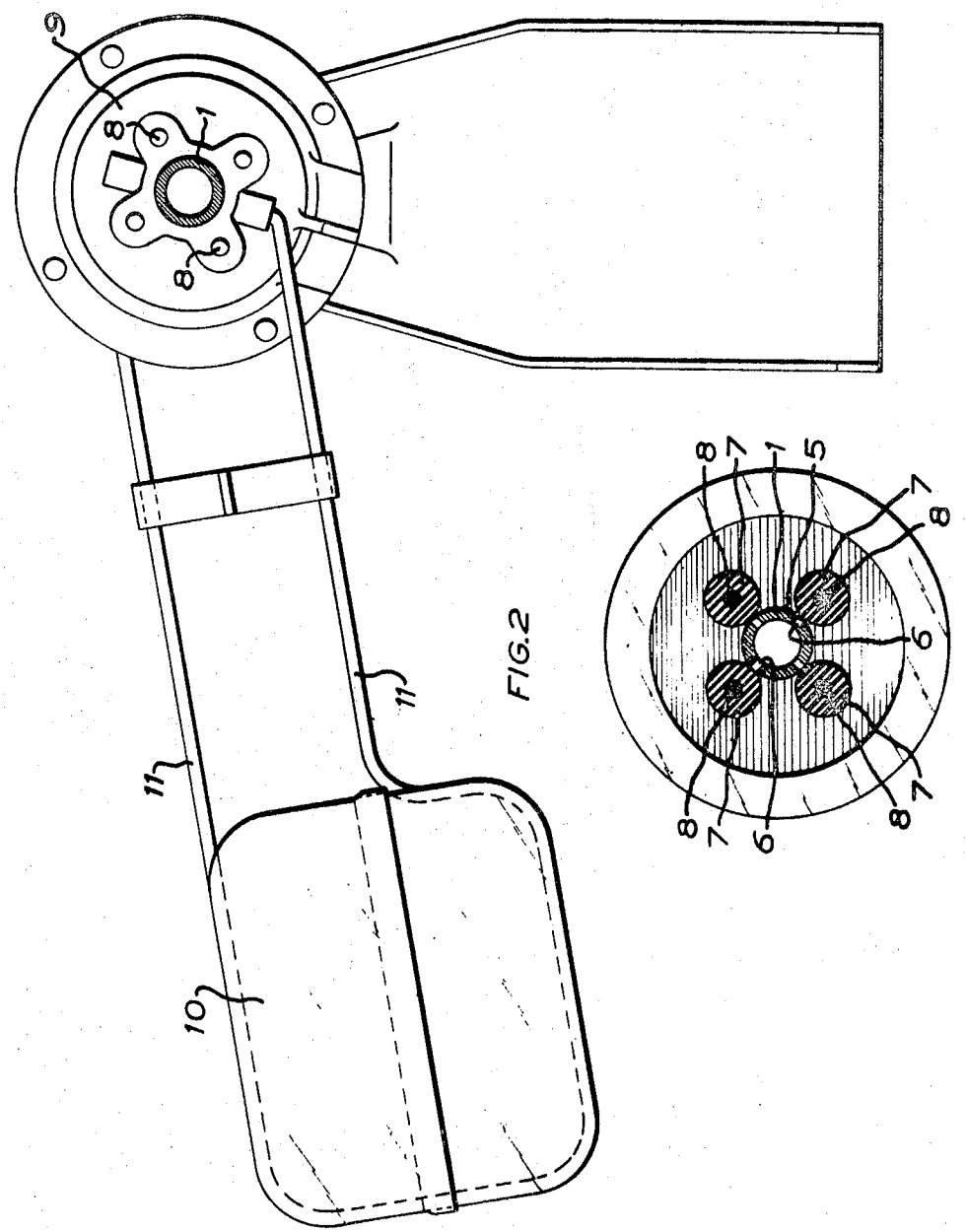

3,465,785
VALVES
Frans Harry Karlsson, Bredgatan 13, Lund, Sweden
Filed Apr. 12, 1967, Ser. No. 630,234
Claims priority, application Sweden, Apr. 25, 1966,
5,569/66
Int. Cl. F16k *31/18;* F17d *3/00*
U.S. Cl. 137—447                                11 Claims

ABSTRACT OF THE DISCLOSURE

A valve having a cylindrical hollow body with a throughflow passage therein piercing one surface thereof, a supporting member mounted for rotation on the hollow body, at least one roller in said supporting member bearing against the surface of the hollow body and movable in relation to said surface to open and close the valve, said roller, when moved in relation to said surface, rolling thereon and at closed valve totally covering and closing the throughflow passage in said surface by means of a small part of its circumference. The valve is intended primarily for use as a float-controlled valve for the automatic refilling of the flushing water tank of a water closet, the float in said tank being arranged to actuate the rotatable supporting member to cause the roller or rollers to roll on said surface of the cylindrical hollow body to open or close the valve.

---

The present invention relates to a novel valve particularly suitable for use in flush tanks of water closets to control the refilling operation however the valve is not limited to such use.

Compared to such prior-art valves as it may suitably replace, the valve of the present invention can be given a simpler, more robust and reliable construction. Over the previously known float-controlled valves for filling the flushing water tanks of water closets the valve according to the present invention implies several very important advantages. One of these advantages is that the force necessary to open and close the valve is practically independent of the water pressure in the water supply pipe leading to the valve, and variations in said pressure do not therefore appreciably affect the weight and displacement of the float controlling the valve; two factors that are imperative in order that the refilling volume of the flushing water tank after each flushing cycle shall be kept constant. Another advantage is that the valve can be designed for a much quicker refilling of the flushing water tank than the hitherto customary float-controlled valves for water closets or the like. A further advantage is that the valve according to the invention ensures that the refilling of the flushing water tank takes place practically without any noise and in any case much more quietly than with the hitherto customary float-controlled refilling valves.

These and further features of the invention and the advantages gained thereby will appear from the following specification in which reference is made to the accompanying drawings illustrating an embodiment chosen by way of example to elucidate the invention.

In the drawings:
FIGURE 1 is an axial section of the valve;
FIGURE 2 is a view of the valve as seen from line II—II in FIGURE 1;
FIGURE 3 is a cross-section of certain details.

In the drawings, 1 denotes an externally cylindrical, for example tubular hollow body which is closed at one end and provided at the other end with a supply socket 3 connected to a water supply pipe 2. When the valve is used as a float-controlled refilling valve for the flushing water tank 4 of a water closet the cylindrical hollow body 1 is fixedly mounted in the flushing water tank with the aid of the supply socket 3 in a manner which will clearly appear from FIGURE 1. The cylindrical outer surface 5 (FIGURE 3) of the hollow body 1 is penetrated by one or more longitudinal throughflow slots 6 or rows of throughflow apertures in the wall of the hollow body, which are spaced equal angular distances apart. In the embodiment illustrated said slots or rows of apertures 6 are four in number. Cylindrical rollers 7 are rotatably mounted by means of their own axes 8 in a supporting member 9 which is mounted for rotation on the cylindrical hollow body 1. Said rollers are arranged in parallel with the cylindrical hollow body 1 and are in bearing application with the cylindrical surface 5 so that when the supporting member 9 is rotated about the cylindrical hollow body 1 the rollers 7 roll on said cylindrical surface 5 and at closed valve each of the rollers covers and closes one of the throughflow slots or rows of throughflow apertures 6 by means of a small part of its circumference, as will appear from FIGURE 3. Secured to the supporting member 9 preferably in a readily detachable manner is a float 10 by means of an arm 11 (FIGURE 2), suitably a metal wire yoke that has its limb ends passed into insertion holes provided in the supporting member 9. The float 10 serves to rotate the supporting member 9 for the rollers 7. At closed valve the rollers 7 occupy the FIGURE 3 position in which each of said rollers covers and closes one of the throughflow slots or rows of throughflow apertures 6 by means of a small part of its circumference. When flushing is performed and as a consequence the water level in the flushing water tank and thereby the float 10 sink, the latter will rotate the roller supporting member 9 so that the rollers 7 uncover the throughflow slots or apertures 6 and water is allowed to flow therethrough into the tank for filling it again, the float being again raised whereby it rotates the roller supporting member 9 until the rollers 7 again close the throughflow slots or apertures 6. Opening and closing of the valve, i.e., rotation of the roller supporting member 9 and the rollers 7 from the position in which the throughflow slots or apertures 6 are closed and back to said position, respectively, encounters but a relatively small resistance owing to the rolling friction between the rollers 7 and the surface 5 penetrated by said slots or apertures 6, and such resistance is insignificantly or not at all affected by the water pressure in the water supply pipe 2. Said pipe, or the inlet to the valve, may preferably be throttled so that at open valve the water flowing therethrough will be subjected to a large pressure and speed reduction on its way to and out through the slots and apertures 6. By reason of said pressure and speed reduction the flow of water into the flushing water tank at the refilling thereof can be caused to take place very quietly and even almost noiselessly. To this contributes that the water jets entering the flushing water tank through the slots or apertures 6 at moderate speed are at once gently deflected by the rollers 7 and are caught in the supporting member 9 to avoid splashing. As will appear from FIGURE 1, the supporting member can be designed for this purpose as a housing preferably composed of two halves and having an outlet 12 leading to a channel 14 which is secured for instance to the closed end 13 of the hollow body 1 and passes the water to the inner side of the flushing water tank wall 4, whereby splashing is avoided.

Since the force required to open and close the valve is but slightly dependent on, or practically independent of, the pressure in the water supply pipe 2 the slots or apertures may be very amply dimensioned so that the difference between their total throughflow area and the smallest throughflow area in the inlet to the valve can be made large, although the smallest throughflow area in said inlet is chosen sufficiently large to ensure that refilling of the tank shall take place in a shorter time than the hitherto customary float-controlled refilling valves permit.

The invention is not restricted to the embodiment described in the foregoing. It can be embodied in several different ways and can serve many different purposes. Thus it is not imperative, although it is particularly advantageous, that a cylindrical shape is given the surface penetrated by the throughflow passage or passages in the valve and forming a path for the roller or rollers to roll on. Said surface may possibly be planar or be given a shape other than a cylindrical surface of revolution, such as conical, in which latter case the rollers also should be conical. In lieu of an external boundary surface the surface of revolution may be formed by an internal boundary surface of a hollow body having an inlet or outlet connected to the interior of said hollow body. An embodiment of the valve, in which the roller or rollers are disposed within a hollow body, may be suitable as a shut-off or control valve, e.g., for central-heating radiators. For most uses that are conceivable for the valve the surface serving as a path for the roller or the rollers to roll on should be relatively hard and the roller circumference relatively soft whereby the most satisfactory effect of the valve is attained. In most cases though not absolutely necessary, it is most suitable for practical reasons that said surface and also the circumference of the roller or rollers be smooth. It has already been mentioned that the number of rollers and associated throughflow passages penetrating the surface that the rollers roll on, can be varied and that in case the rollers are two or more in number they should preferably be arranged so as to be jointly movable in relation to the surface that they roll on when the valve is opened and closed. The roller or rollers should have their peripheries coated with rubber or equivalent other material elastically yielding to local pressure on the roller circumference and capable at closed valve to sealingly engage the edges of the throughflow passage or passages penetrating the surface forming a path for the roller or rollers to roll on.

I claim:
1. A valve comprising a valve surface penetrated by a throughflow passage and at least one movable valve member in the form of a roller having an outer peripheral surface in direct tangential engagement with said valve surface and adapted for rolling movement thereon, said valve surface being an external surface of revolution of a hollow body having an inlet to the interior thereof and provided in its wall with at least one aperture constituting the throughflow passage penetrating said valve surface, said roller being adapted, during rolling movement in direct contact with said valve surface, to be moved between positions in which it covers said throughflow passage in said valve surface with part of its circumference and uncovers said passage, respectively, said valve surface being free of any obstruction between the roller and the valve surface such that when the roller uncovers said aperture fluid is free to escape from the aperture and away from the valve surface to avoid any pressure building between the valve surface and the roller.

2. A valve as claimed in claim 1, wherein both said valve surface of the hollow body and said roller is cylindrical.

3. A valve as claimed in claim 1, wherein said valve surface of the hollow body consists of relatively hard material and the circumferential surface of said roller consists of elastically yielding material.

4. A valve comprising a valve surface penetrated by a throughflow passage and at least two movable valve members in the form of rollers held in engagement with said valve surface and adapted for rolling movement thereon, said valve surface being a surface of revolution of a hollow body having an inlet to the interior thereof and provided in its wall with at least two apertures in and disposed around said hollow body, and a supporting member arranged rotatable in relation to said surface of revolution about the axis thereof and having means rotatably supporting said rollers in spaced relation corresponding to the angular positions of said apertures respectively and for rolling angular movement relative to said supporting member and on said valve surface between positions covering and uncovering said apertures respectively.

5. A valve as defined in claim 4 wherein said apertures are slots elongated in the longitudinal direction of said body.

6. A valve as claimed in claim 4, wherein said external surface of revolution of the hollow body and each roller are cylindrical and the rollers are in direct tangential engagement with said valve surface.

7. A valve as claimed in claim 4, wherein said hollow body is fixedly mounted and wherein said supporting member is rotatably mounted on said body with the rollers in tangential and pressure engagement with said cylindrical surface for rolling movement thereon whenever the supporting member is rotated in relation to said fixedly mounted hollow body.

8. A valve as claimed in claim 4, wherein the hollow body is a cylindrical hollow body and the roller supporting member mounted for rotation on the cylindrical hollow body constitutes a housing enclosing the rollers and preferably composed of two halves and having an outlet therefrom for discharging fluid from the apertures.

9. A valve comprising in combination; a valve body having a passage therein and an inlet into said passage, said valve body having an external surface of revolution and a port extending through a wall of the valve body and interconnecting the passage and the exterior of the body adjacent the surface of revolution, a support member rotatably mounted about said valve body to be rotatable relative to said valve body, a roller engageable on said external surface of the valve body between a position closing said port and a position opening said port, said support member having means mounting said roller for rotation relative to said support member and for rolling engagement on and relative to said body whereby upon rotation of said support member relative to said valve body said roller will move relative to said support member and said valve body to open or close said port depending on the direction of rotation of said support member.

10. A valve as defined in claim 9 further including, float means adapted to float on a liquid surface, an arm connecting said float means and said support member, said support member being rotatable by swinging movement of said arm transmitted thereto by said float means such that the position of said roller in relation to said port is automatically regulated by the liquid level.

11. A valve as claimed in claim 10, wherein said body is mounted in the flushing water tank of a water closet and has its inlet connected to the water supply pipe of the flushing water tank, and said float means connected to said roller support member by said arm is adapted to float in the water in said water tank for actuating the valve in dependence on the water level therein.

References Cited
UNITED STATES PATENTS

| 1,544,608 | 7/1925 | Smith et al. | 137—447 |
| 2,989,076 | 6/1961 | Rohmann | 137—625.2 |

FOREIGN PATENTS

| 119,669 | 3/1945 | Australia. |

WILLIAM F. O'DEA, Primary Examiner

D. R. MATTHEWS, Assistant Examiner

U.S. Cl. X.R.

137—625.2